United States Patent
Asakura et al.

(10) Patent No.: US 6,234,546 B1
(45) Date of Patent: May 22, 2001

(54) LOCK DEVICE FOR COVER

(75) Inventors: Yukio Asakura; Teruhito Momoi, both of Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/369,479

(22) Filed: Aug. 6, 1999

(30) Foreign Application Priority Data

Aug. 7, 1998  (JP) .................................................. 10-224594

(51) Int. Cl.[7] ....................................................... E05G 1/12
(52) U.S. Cl. .................................. 292/165; 292/DIG. 11; 114/55.53; 114/203
(58) Field of Search ..................................... 292/140, 157, 292/165, 169, 336.3, 256.5, 341.15, 37, DIG. 11, DIG. 63; 114/55.53, 203, 201 R; 296/37.1, 37.7; 49/348, 293, 294

(56) References Cited

U.S. PATENT DOCUMENTS

| | | | |
|---|---|---|---|
| 109,330 | * 11/1870 | Maddox | 292/256.5 |
| 933,070 | * 9/1909 | Gleason | 114/201 R |
| 1,560,489 | * 11/1925 | Yager | 292/37 |
| 2,092,225 | * 9/1937 | Schreiber | 70/153 |
| 3,043,617 | * 7/1962 | Shelton | 292/6 |
| 3,913,971 | * 10/1975 | Green | 296/137 |
| 4,616,863 | * 10/1986 | Bryant | 292/302 |
| 4,644,891 | * 2/1987 | Niina | 114/201 R |
| 4,909,176 | * 3/1990 | Kobayashi | 114/343 |
| 5,005,506 | * 4/1991 | Handmer | 114/270 |
| 5,056,846 | * 10/1991 | Tanaka | 296/37.1 |
| 5,076,190 | * 12/1991 | Iikawa | 114/270 |
| 5,255,626 | * 10/1993 | Hattori | 114/270 |
| 5,425,560 | * 6/1995 | Andersen | 292/163 |
| 5,551,737 | * 9/1996 | Clavin | 292/169 |

FOREIGN PATENT DOCUMENTS 2599336   9/1997   (JP) .

OTHER PUBLICATIONS

Patent Abstract of Japan 06227486; publication Aug. 16, 1994; Kawasaki Heavy Ind Ltd; T. Yoshinori; Locking Device For Hatch Cover of Small–Sized Planing Boat.

* cited by examiner

Primary Examiner—Gary W. Estremsky
(74) Attorney, Agent, or Firm—Marshall, O'Toole, Gerstein, Murray & Borun

(57) ABSTRACT

A lock device of a cover, especially of a hatch cover of a personal watercraft, having operation members disposed on a lower surface of the cover which is locked by an engagement with a hold pin and is released by a releasing operation of the operation members. The locking device includes a frame member having operation members located at both sides of and under the lower surface of the cover. The frame member further includes, a pair of slide members each of which slides in a direction away from the operation member by the releasing operation of each of the operation members, a moving member which is caused to move in the direction perpendicular to the sliding direction of the sliding members in response to the sliding movement of either one or both of the slide members, and an engaging member which moves together with the moving member to move into an engaging hole for engaging the hold pin.

7 Claims, 9 Drawing Sheets

LOCK DEVICE FOR COVER

BACKGROUND OF THE INVENTION

1. Field of the Invention

The present invention relates to a lock device for locking at a closed position of a pivoted cover such as a seat of a motorcycle, a basket cover of a utility vehicle, and a hatch cover of a personal watercraft.

2. Description of the Related Art

Conventionally, a pivoted cover such as a seat of a motorcycle, a basket cover of a utility vehicle, and a hatch cover of a personal watercraft (hereinafter called "cover" generally) is locked at its closed position during normal operation and is opened when necessary.

As an example of such covers, a hatch cover of a personal watercraft for running on the water will be explained below. The personal watercraft is operated by a driver sitting astride a seat on a rear portion of a deck grasping a steering handle disposed in a front and upper portion of the seat, and is used on waters near the coast mainly for the purpose of leisure or of sports. The personal watercraft runs on the water by a propulsion unit mounted on a rear portion of a body of the watercraft and driven by an engine mounted in an engine room in the body, and is steered by changing the propelling direction of the propulsion unit.

A hatch cover of such a personal watercraft is provided to cover an upper portion of an opening formed in a front portion of the deck for feeding fuel to a fuel tank or for inspecting the engine or the like in the body, and a front end of the hatch cover is pivotally supported to the deck, and a rear end thereof can be opened upward. Further a driver opens and closes the hatch cover to accommodate or take out goods such as a life jacket, in or from a storage compartment disposed within the opening by getting off the seat of the personal watercraft. During normal operation of the watercraft, the hatch cover is maintained in a closed position by a lock device to keep the opening tightly closed.

The related art of such a lock device is disclosed in Japanese Patent Publication No. 2599336. A plan view of the personal watercraft is shown in FIG. 9. A hatch cover 51, generally made of fiber reinforced plastics (FRP), is disposed on an upper surface of a deck 52 in front of a driver's seat, and is mounted on the deck 52 such that the hatch cover 51 can be opened forwardly around a hinge 53 provided on a front end of the hatch cover (front end of the deck). A lock device 54 is provided on a central portion of a rear end of the hatch cover 51 at the opposite side of the hinge 53. The hatch cover 51 is locked to the deck 52 at its closed position by the lock device 54. The lock device 54 is constructed such that the locked state is released by upwardly turning an operation lever 55 provided on an upper surface of the hatch cover which forms an outer surface of the personal watercraft, and the hatch cover 51 can be opened from the sides of the watercraft.

However, as shown in the perspective view of FIG. 10, the presence of the operation lever 55 for opening the hatch cover 51 may sometimes hinder the continuity of the outer surface of the personal watercraft, deteriorating the external appearance of the personal watercraft when a design of speedy appearance or external beauty is a significant factor.

Further, in recent years, the personal watercrafts of this type tend to increase in size with larger storage compartments, which correspondingly increases the size of the hatch cover 51. Therefore, it makes difficult to open the hatch cover in some cases, when the operation lever is hardly within reach of the driver's hand from the side of the personal watercraft.

Therefore, in such a personal watercraft, the lock device of the cover is required to be operable from both sides of the watercraft of increased size, without deteriorating the external appearance of the personal watercraft.

SUMMARY OF THE INVENTION

The present invention has been made to meet such requirements, and it is an object of the invention to provide a lock device of a cover which lock device is operable from both left and right sides of the cover without deteriorating the external appearance of the personal watercraft.

To achieve the above object, the present invention provides the lock device of a cover having operation members disposed on an inner surface of the cover for releasing the engagement with a hold pin disposed on a member to which the cover is locked by a releasing operation of the operation member, wherein the lock device includes, a frame member formed to locate the operation member at both sides below the inner surface of the cover, the frame member further includes a pair of slide members each of which slides in a direction away from the operation member by the releasing operation of each of the operation members, a moving member which is caused to move in a direction perpendicular to a sliding direction of the slide members by sliding motion of either one or both of the slide members, and an engaging member which moves together with the moving member to move into an engaging hole for engaging the hold pin.

With this structure, the releasing operation of the operation member can be carried out by operating either one or both of the operation members from any of left and right side of the cover. After the releasing operation, the cover can be opened upward. Since the operation members are located below the inner surface of the cover, the external appearance of the cover is not deteriorated. Further, even if this lock device is employed for a hatch cover of a personal watercraft which tends to increase in size, the hatch cover can be opened and closed from any of the left and right sides of the personal watercraft. Furthermore, since the lock device is arranged in a position where the lock device is not easily noticeable from outside of the cover, the external appearance of the personal watercraft is not deteriorated.

When the moving member is provided with a spring member, the engaging members can be automatically returned to the locked position after the lock is released, and therefore, the cover can be automatically locked when the cover is closed.

Further, when each of the slide members and the operation members are provided with a spring member, these movable members can be returned more smoothly to their original locked positions before the releasing operation.

Furthermore, there is provided a lock device of a cover for covering a hatch provided in front of a steering handle of a personal watercraft on which a driver sits on a rear portion of a deck and grasps the steering handle to operate, wherein the lock device is provided on an inner surface of a rear portion of the cover, and operation members for releasing the lock of the lock device are disposed on both left and right sides of the cover, and the lock device is constructed such that an engaged state (locked state) of the hatch cover can be released by operating either one or both of the levers of the operation members. With this structure, the operation members can be operated from any of the left and right side of the watercraft to open the cover.

When the engaged state (locked state) of the hatch cover is released by operating the operation member upward, the releasing operation of the lock of the cover and the opening operation for bringing up the cover can be carried out continuously and the cover can be opened effectively.

When the releasing operation of the operation members is carried out by turning the operation members, the lock of the cover can be released with a small force utilizing the principle of a lever.

Further, it is preferable that the lock device is constructed such that a frame member is mounted to an inner surface of a rear portion of the cover, the frame member is formed such that the pair of left and right operation member are located at both sides of the cover, the frame member further includes, a pair of slide members each of which slides in a direction away from the operation member by the releasing operation of each of the operation members, a moving member which is moved in a direction perpendicular to a sliding direction of the sliding members by sliding either one or both of the slide members, and an engaging member which moves together with the moving member to move into an engaging hole for engaging a hold pin disposed on the deck. With this structure, the releasing operation can be carried out by the operation member of any of the left and right side of the cover, the operation member slide the slide members to move the engaging member together with the moving member to release the engagement with the hold pin and therefore, it is possible to construct the lock device capable of carrying out the opening operation from any of the left and right sides of the personal watercraft. Further, if each of the operation members, the slide member and the moving member is provided with a spring member, these members can be returned automatically to the locked position (locked state) after the lock is released.

These objects as well as other objects, features and advantages of the present invention will become more apparent to those skilled in the art from the following description with reference to the accompanying drawings.

BRIEF DESCRIPTION OF THE DRAWINGS

FIG. 1 is a perspective views of a personal watercraft having a lock device according to an embodiment of the present invention, wherein FIG. 1(a) is a perspective view of the personal watercraft when a hatch cover is closed, and FIG. 1(b) is a perspective view the personal watercraft when the hatch cover is opened;

DESCRIPTION OF THE PREFERRED EMBODIMENTS

An embodiment of the present invention will be explained in connection with accompanied drawings. In the following description, explanation will be made to a preferred embodiment of a hatch cover of a personal watercraft.

Figure 1:
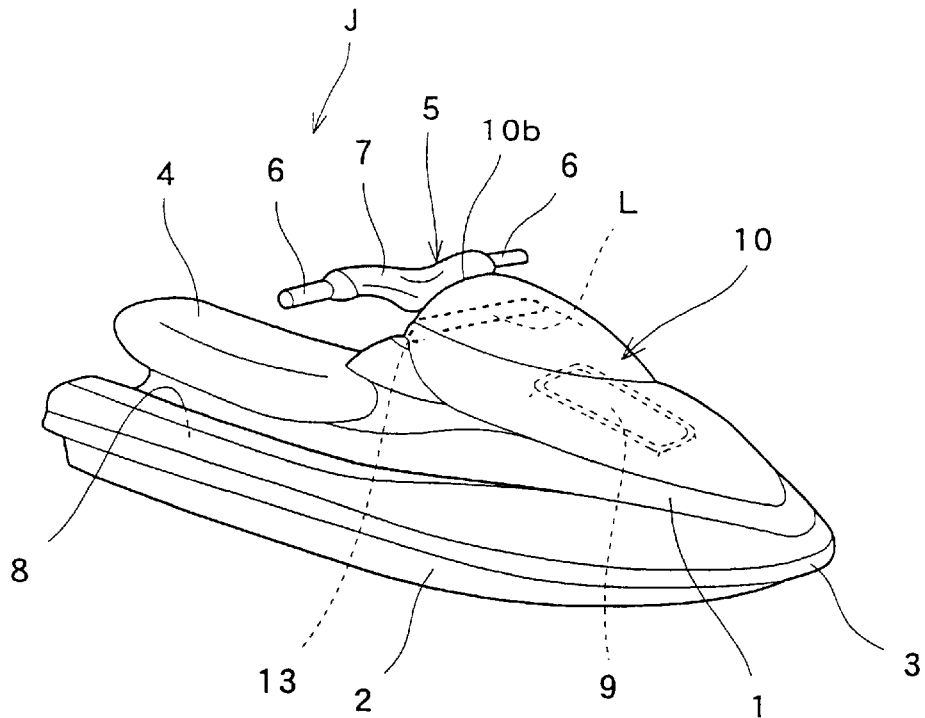
Figure 1:
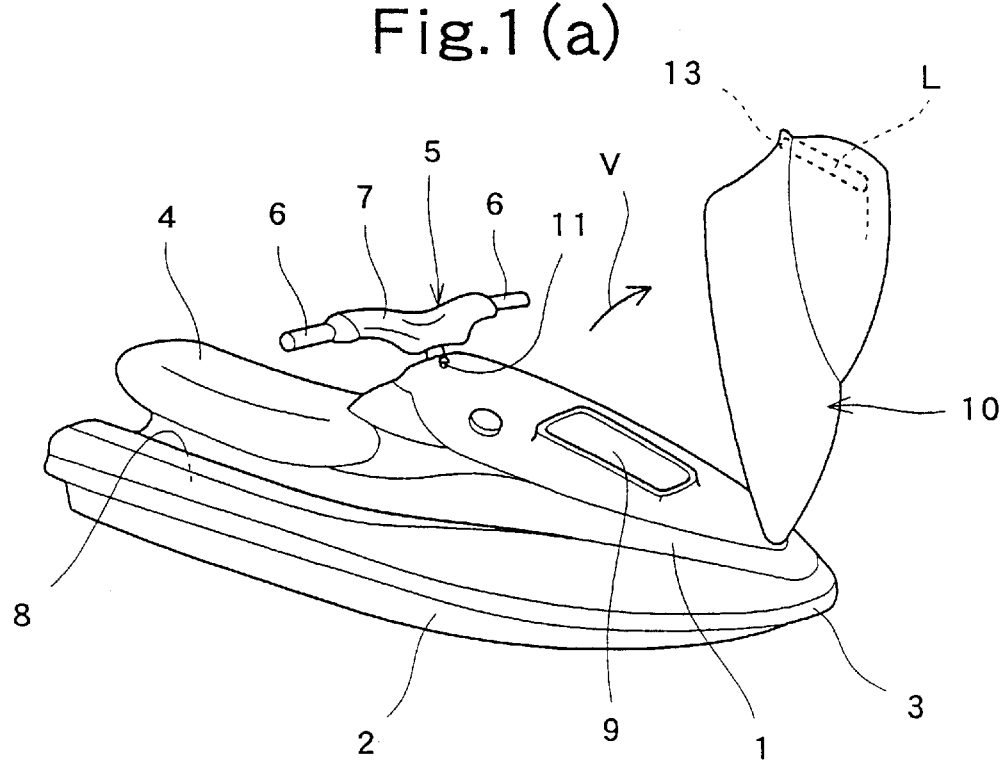
Figure 2:
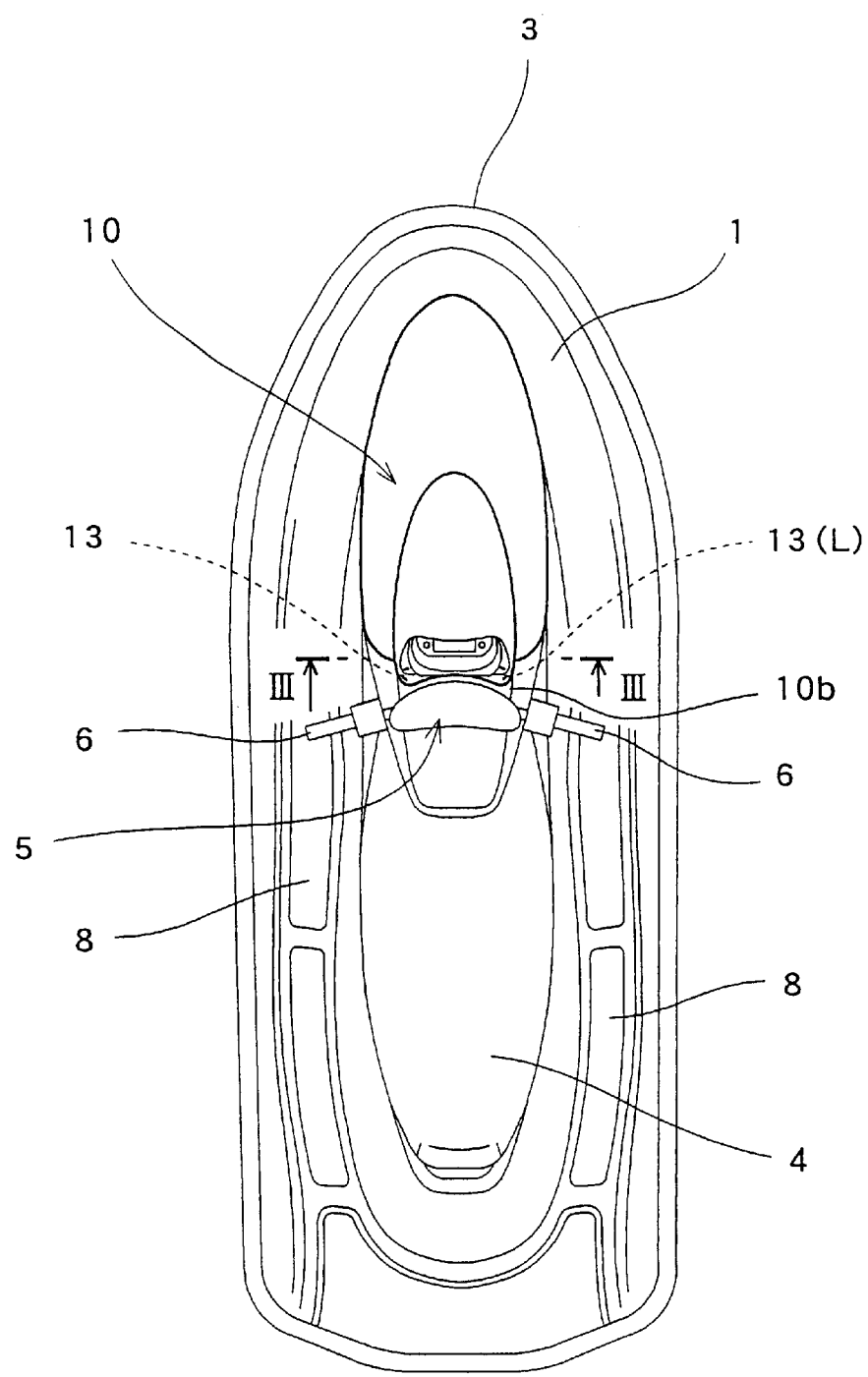
FIG. 2 is a plan view of the personal watercraft shown in FIGS. 1(a) and 1(b)

FIGS. 1(a) and 1(b) are perspective views of the personal watercraft having a lock device according to an embodiment of the invention, wherein FIG. 1(a) is a perspective view of the personal watercraft when the hatch cover is closed, and FIG. 1(b) is a perspective view of the personal watercraft when the hatch cover is opened. FIG. 2 is a plan view of the personal watercraft shown in FIG. 1(a).

The personal watercraft J shown in FIGS. 1(a) and 1(b) has a body comprising a hull 2 and a deck 1 covering an upper side of the hull 2. The deck 1 and the hull 2 are jointed to each other through flange portions 3 formed therearound. The deck 1 and hull 2 are formed of a plastic material such as of fiber reinforced plastics.

A driver's seat 4 is mounted on a rear portion of the deck 1. The seat 4 is formed into a size to accommodate one or two persons in addition to the driver. The driver sitting astride on the seat 4 operates the personal watercraft grasping grip portions 6 provided on both ends of a steering handle 5 disposed on the deck 1. The reference number 7 denotes a handle cover for covering a portion of the steering handle 5.

Steps (foot rests) 8 are formed on both sides of the seat 4 of the deck 1. The driver operates the personal watercraft sitting astride on the seat 4 positioning feet on the steps 8, and gripping portions 6 of the handle 5.

An opening 9 is formed at the front portion of the deck 1 for inspecting an engine (not shown) in an engine room formed inside the body or for feeding fuel to a fuel tank (not shown). A hatch cover 10 is provided on the deck 1 to cover the opening 9. The hatch cover 10 is pivoted at its front end and is adapted to open and close at its rear end in the direction shown with the arrow V to cover and uncover an upper surface of the opening 9. A storage compartment (not shown) is normally provided inside of the opening 9.

Figure 3:
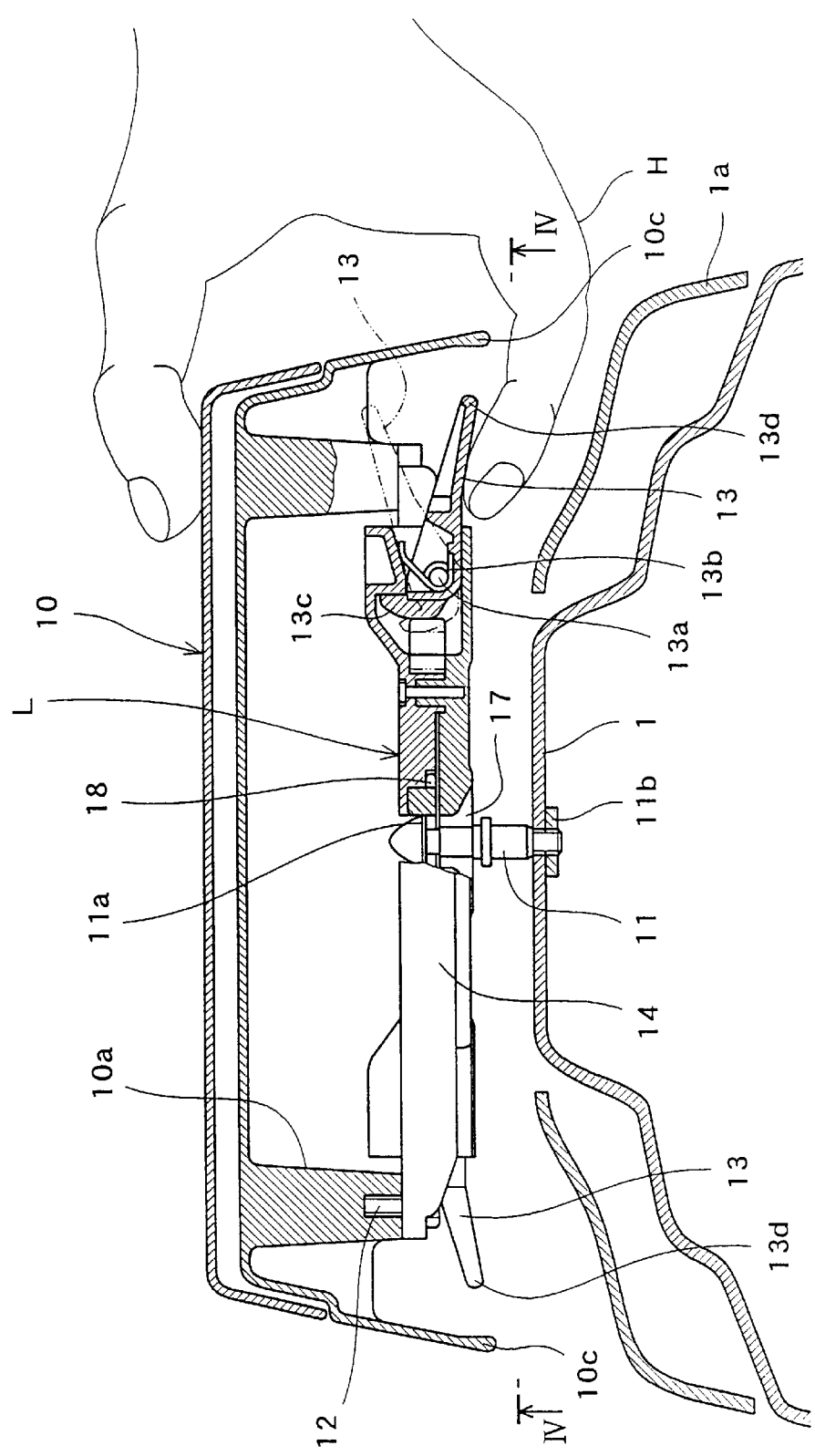
FIG. 3 is a sectional view taken along the line III—III in FIG. 2.
Figure 4:
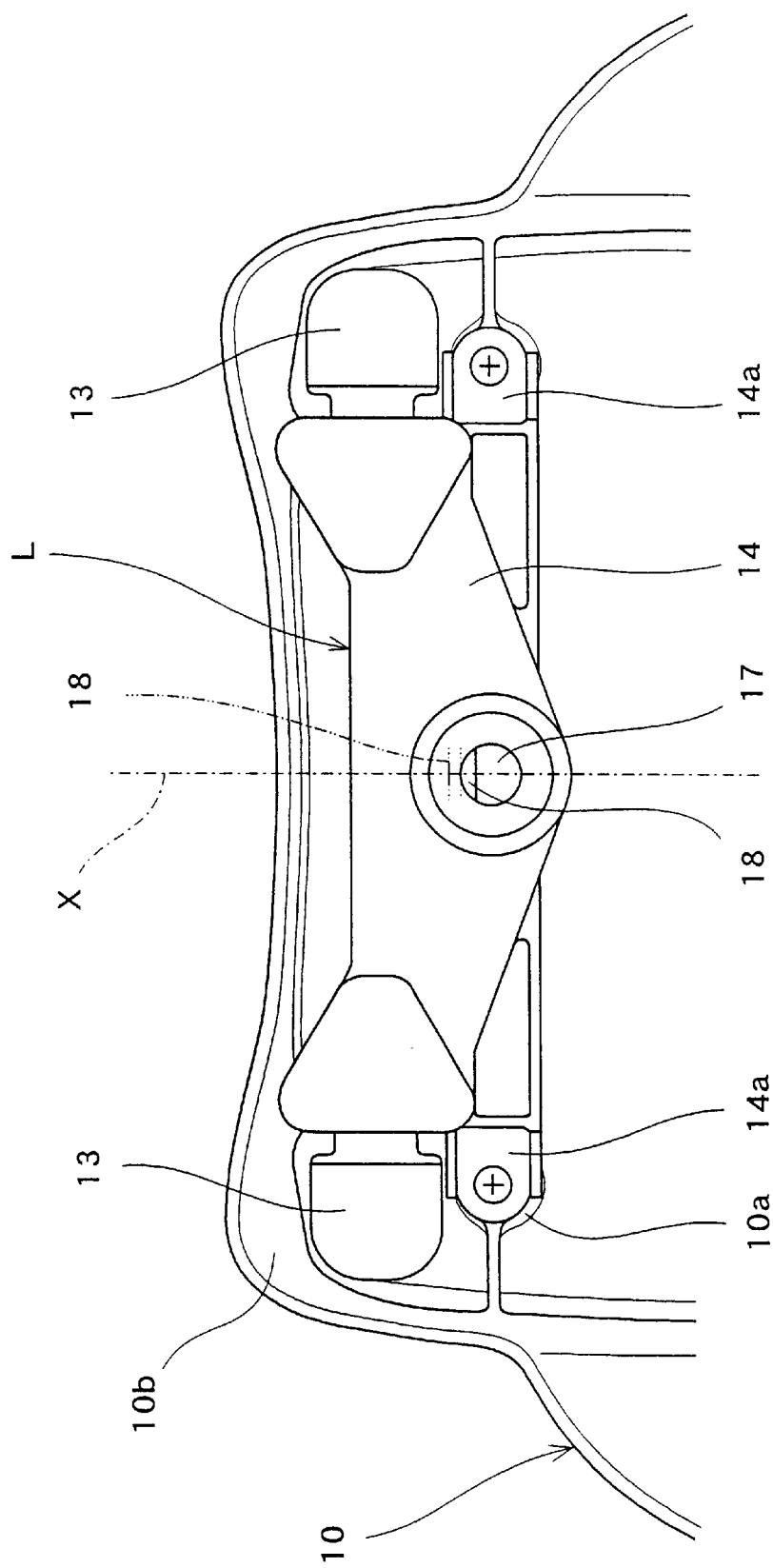
FIG. 4 is a sectional view taken along the line IV—IV in FIG. 3.

FIG. 3 is a sectional view taken along the line III—III in FIG. 2, and FIG. 4 is a sectional view taken along the line IV—IV in FIG. 3. As shown in FIG. 3, a gap is formed between a lower end 10c of the hatch cover 10 and the upper surface of the deck 1 (or a deck cover 1a) when the hatch cover 10 is closed, and a lock device L provided on an inner surface of the hatch cover 10 is engaged with a hold pin 11 provided on the upper surface of the deck 1. The hold pin 11 is provided at the central portion of the deck 1 in front of the handle (see FIG. 1(b)), and the hold pin 11 is secured to the deck 1 with a nut 11b such that an engaging portion 11a of the hold pin 11 is located at a predetermined height from the upper surface of the deck 1. The lock device L is secured by a bolt 12 to a mounting portion 10a provided to project downward from an inner surface of a rear portion of the hatch cover 10. The lock device L is provided at its both ends with operation members 13 for the releasing operation. An outer end of a lever portion 13d of each of the operation members 13 is located at about the same height as the lower end 10c of the hatch cover 10.

As shown in FIG. 4, the lock device L is secured to an inner surface of the rear end 10b of the hatch cover 10 (at the side of the seat 4, see FIGS. 1(a) and 1(b)). The lock device L is formed symmetrically with respect to a center line X in widthwise direction of the hatch cover 10. The operation members 13 are provided at the left and right ends of the lock device L, and are located at left and right opposite sides of the rear end 10b of the hatch cover 10. The lock device L however may not necessarily be formed symmetrically in the lateral direction.

Figure 5:
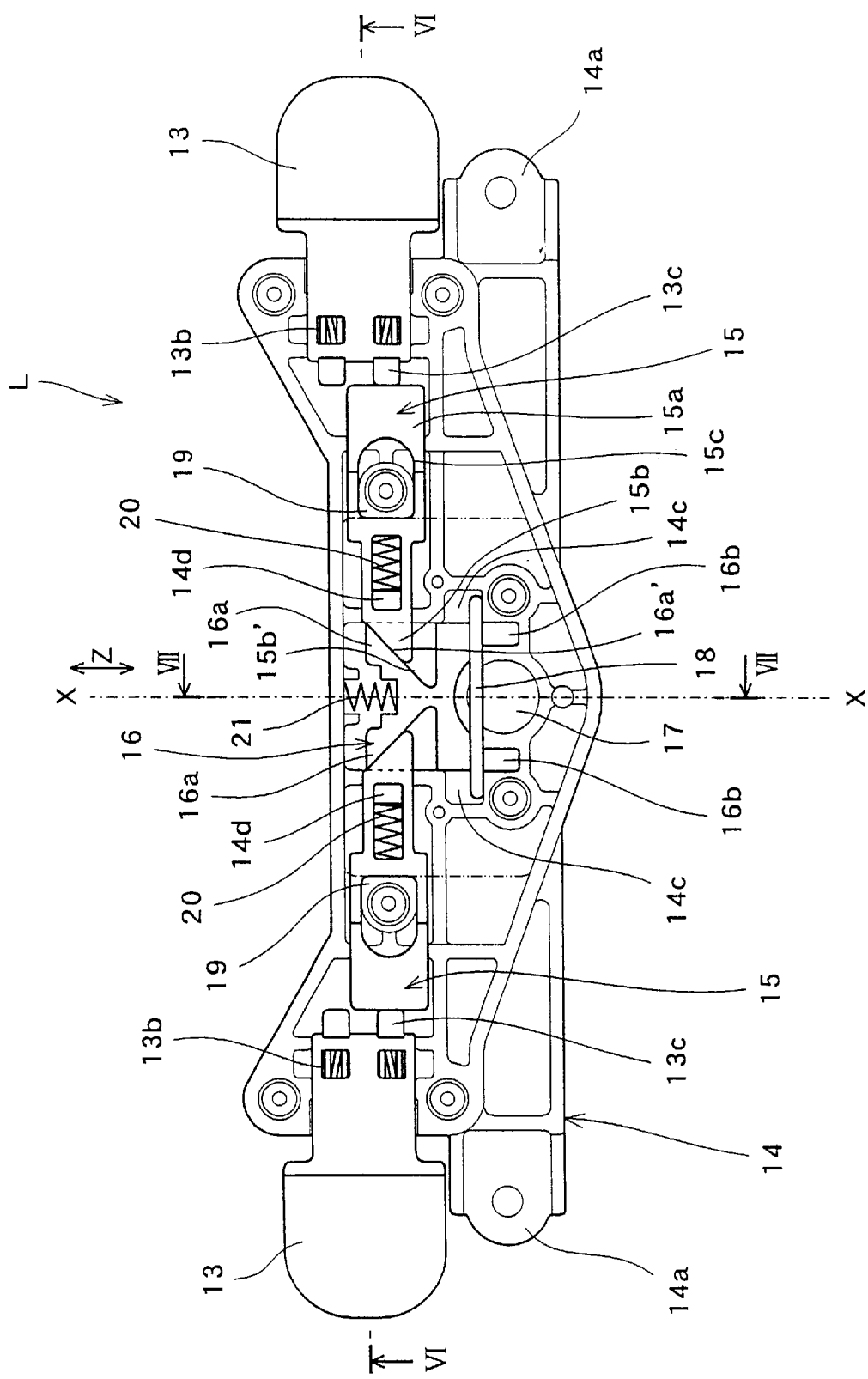
FIG. 5 is a plan view showing inside of the lock device shown in FIG. 4.
Figure 6:
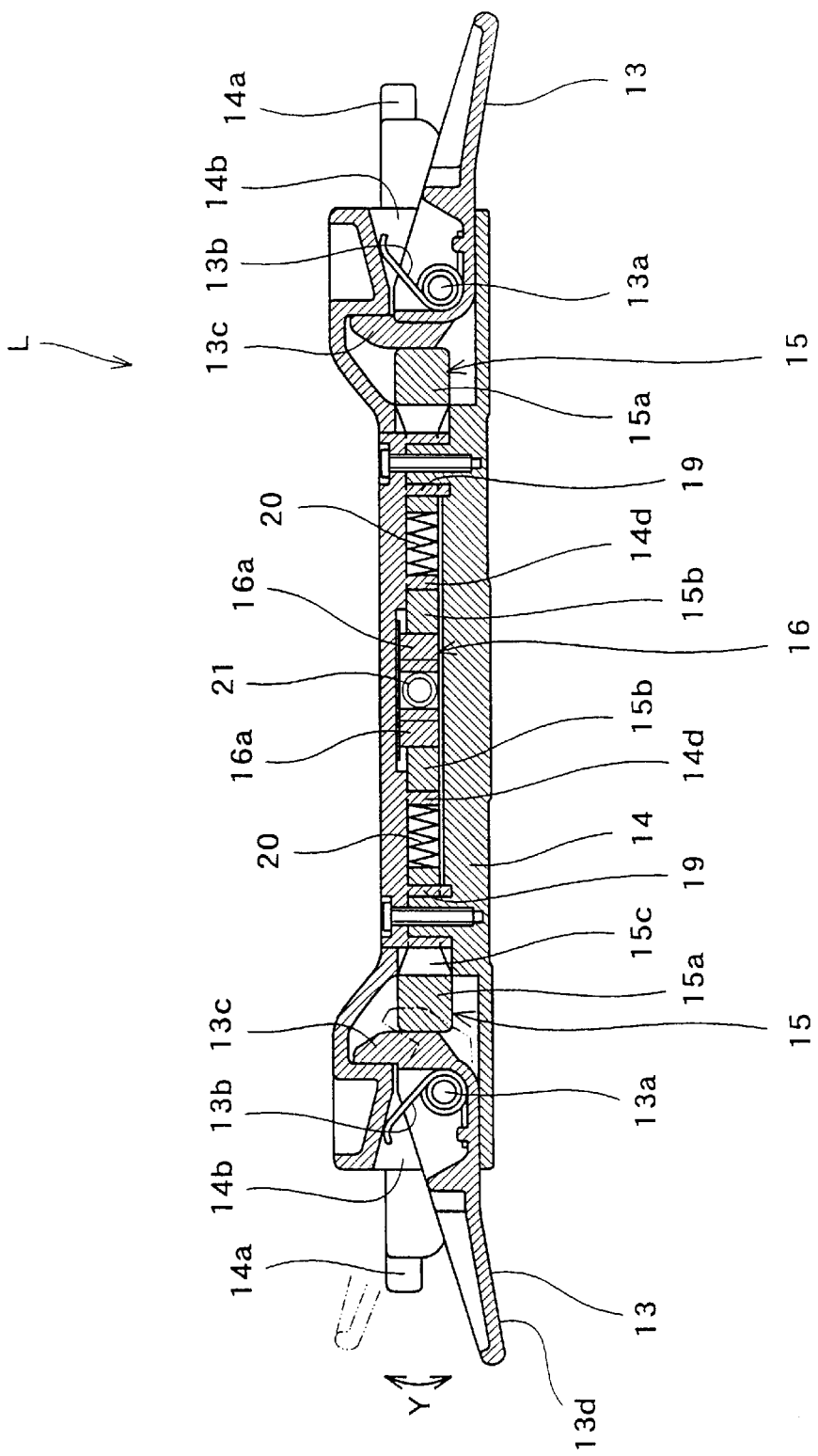
FIG. 6 is a sectional view taken along the line VI—VI in FIG. 5.
Figure 7:
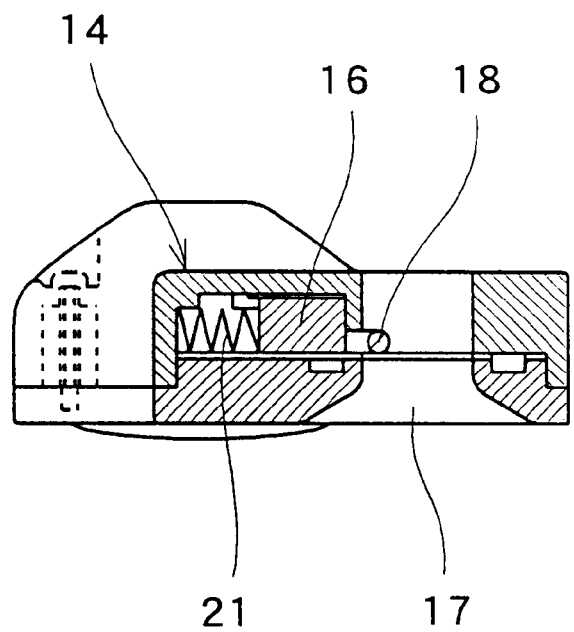
FIG. 7 is a sectional view taken along the line VII—VII in FIG. 5.

FIG. 5 is a plan view showing the inside of the lock device shown in FIG. 4, FIG. 6 is a sectional view taken along the line VI—VI in FIG. 5, and FIG. 7 is a sectional view taken along the line VII—VII in FIG. 5.

As shown in FIG. 5, the lock device L includes a frame member 14 provided at its left and right portions with mounting portions 14a to be mounted to the hatch cover 10 (FIG. 4), and the operation members 13 located at the both sides of the frame member 14 for releasing the lock device L. The operation members 13 are provided to project from openings 14b (FIG. 6) formed at both ends of the frame member 14, and are formed to extend almost in the full lateral width of the rear end 10b of the hatch cover 10 (see FIG. 4).

As shown in FIG. 6, the frame member 14 is divided into upper and lower portions, and is provided in its divided portion with a pair of left and right slide members 15 each of which slides in a direction away from the operation member 13 (in a direction toward the center line X (FIG. 4)) by turning the operation member 13 upward in the vertical direction Y. As shown in FIG. 5, on the center line X between both the slide members 15 are provided a moving member 16 which is caused to move by the slide movement of one or both of the sliding members 15 in the direction Z perpendicular to the sliding direction of the slide members 15, and an engaging member 18 which moves together with the moving member 16 to move into an engaging hole 17 formed in the frame member 14 to engage the hold pin 11 (FIG. 3).

As shown in FIG. 6, each of the operation members 13 is supported by the frame 14 around a supporting shaft 13a, and is biased downward by a spring member 13b of a torsion coil type. The operation member 13 is adapted to turn upward by a determined angle within a range of the opening 14b provided in both sides of the frame member 14. The size of the opening 14b provided in each of the opposite sides of the frame member 14 which limits the range of the turning movement of the operation member 13 is determined by a sliding amount of the slide member 15 caused by the operation member 13, and by a moving amount (moving amount in the direction Z in FIG. 5) of the moving member 16 which is moved by the slide member 15. A pushing portion 13c is formed at the inner side of the operation member 13. The pushing portion 13c pushes the slide member 15 in a direction toward the center (toward the moving member 16) by turning the lever portion 13d of the operation member 13 around the supporting shaft 13a upward. In the embodiment, the slide member 15 is pushed by turning the lever portion 13d upward, however, the turning direction of the lever portion 13d is not limited to the upward direction only.

As shown in FIG. 5, each of the slide member 15 has a guide portion 15a which is caused to slide by the pushing portion 13c of the operation member 13, and a sloped end portion 15b formed on the inner end of the guide portion 15a. The sloped end portion 15b is formed at its inner end with a sloped surface 15b' which meshes with a sloped surface 16a' of the moving member 16. The guide portion 15a is provided with a slot 15c which slides along a guide member 19 formed on the frame member 14. A spring member 20 is provided between the sloped end portion 15b and a projection 14d of the frame member 14, and thus the slide member 15 is always biased toward the operation member 13. The slide members 15 are also arranged symmetrically in the lateral direction. In this embodiment, the operation member 13 and the slide member 15 are formed as separate members, however, the operation member 13 may be formed as a pushing type which pushes the slide member 15 in the slide direction, or the operation member 13 and the slide member may be connected together to form a single member.

As shown in FIG. 5, the moving member 16 comprises a sloped end portion 16a having the sloped surface 16a' which meshes with the sloped surface 15b' of the sloped end portion 15b of the sliding member 15, and engaging portions 16b formed integrally with the sloped end portion 16a and projecting to both sides of the engaging hole 17. The sloped surface 16' of the moving members 16 are formed to have the same inclining angle as the sloped surfaces 15' of the sliding members. The engaging portion 16b is integrally provided with the bar-like engaging member 18. Therefore, when the slide member 15 is pushed inward, the moving member 16 and the engaging member 18 are moved in the direction Z by a cam action of the sloped surfaces 15b' and 16a.' Further, a spring member 21 is provided between the sloped end portion 16a and the frame member 14 so that the moving member 16 is always biased toward the engaging hole 17. The engaging member 18 provided on the moving member 16 is adapted to move along the guide portion 14c of the frame member 14 (in the direction of the center line X in FIG. 4). The moving member 16 is formed symmetrically with respect to the center line of the engaging hole 17. In this embodiment, the engaging member 18 is formed of the bar-like member, however it may be formed of other shapes.

As shown in FIGS. 7 and 3, a lower portion of the engaging hole 17 in the frame member 14 is formed into a sloped (conical) surface to increase diameter downwardly so that a tip end of the hold pin 11 can easily be inserted. A tip end of the hold pin 11 is also formed into a conical shape, so that the hold pin 11 can be inserted easily along the sloped surface of the engaging hole 17.

Figure 8:
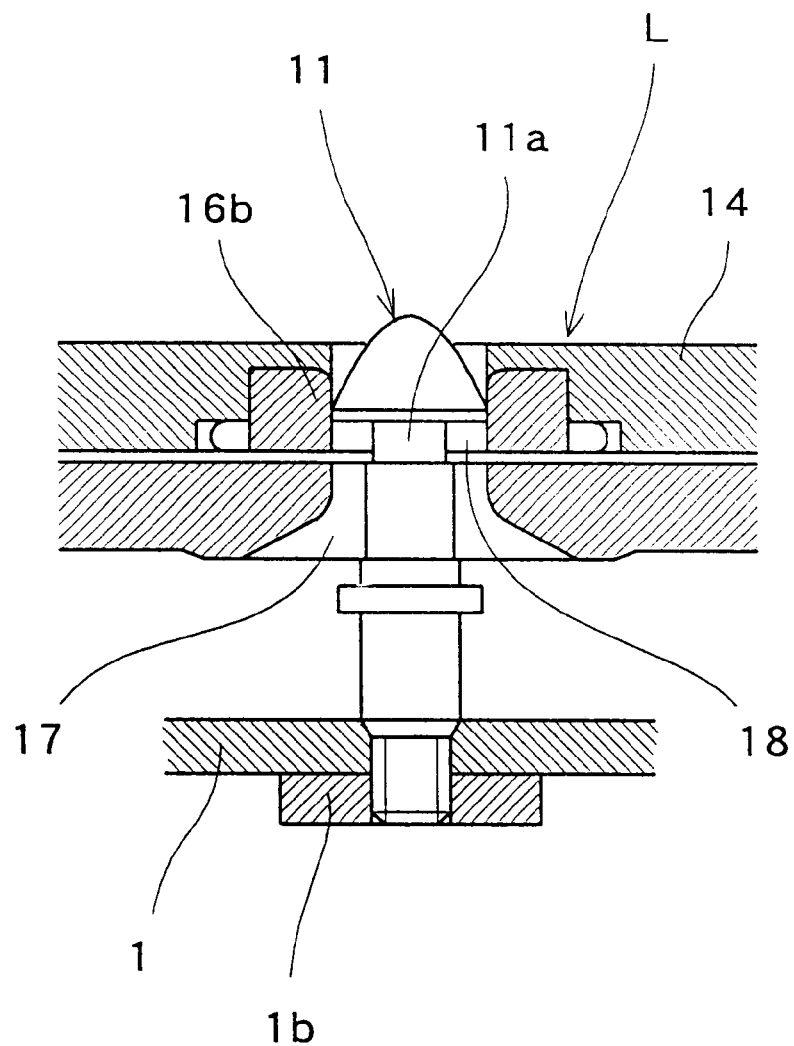
FIG. 8 is an enlarged sectional view showing an engaging portion in FIG. 3.
Figure 9:
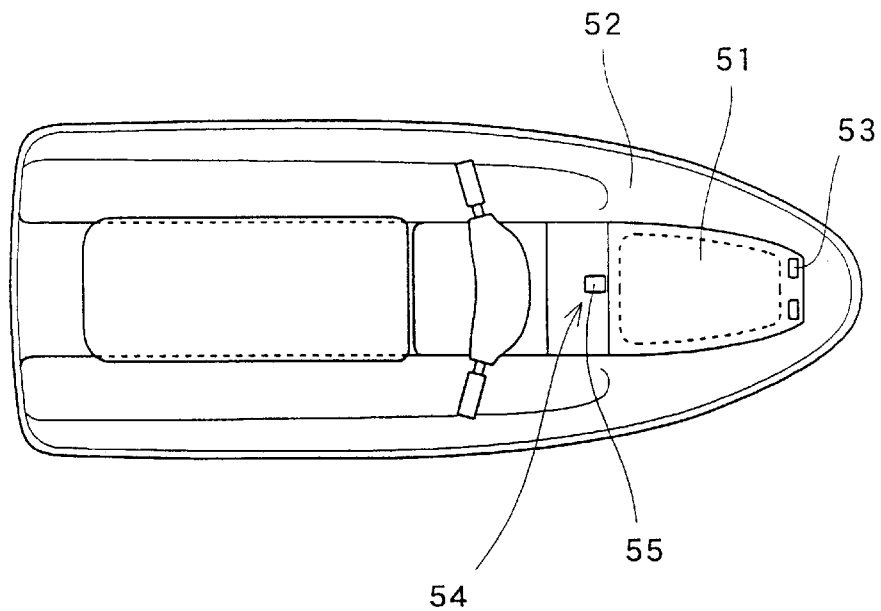
FIG. 9 is a plan view showing a conventional personal watercraft.
Figure 10:
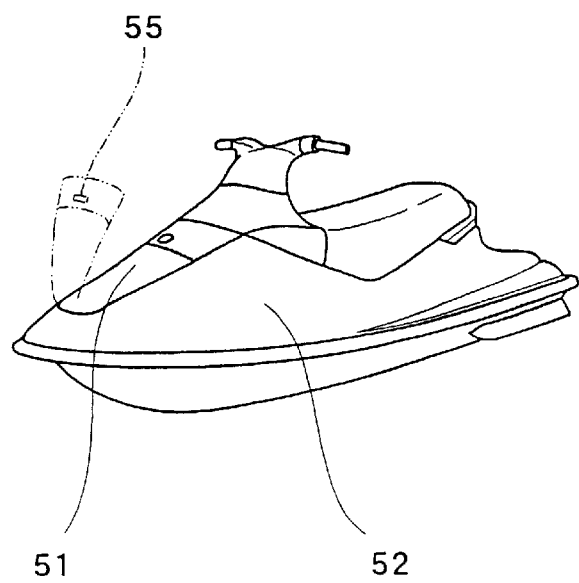
FIG. 10 is a perspective view of the conventional personal watercraft.

FIG. 8 is an enlarged sectional view showing an engaging state (locked state) between the hold pin and the engaging member 18. The tip end of the hold pin 11 is formed into the conical shape, and a groove-like engaging portion 11a is formed below the conical portion of the hold pin 11. When the hatch cover 10 is closed in a state in which the engaging member 18 projects into the engaging hole 17 (see FIG. 4), the engaging portion 11a of the hold pin 11 inserted in the engaging hole 17 engages the engaging member 18 to hold the lock device L (hatch cover 10) in its closed state. In this state, the engaging member 18 is always biased toward the engaging hole 17 (see FIG. 5) by a spring member 21 which maintains the engagement between the engaging member 18 and the hold pin 11, and thus maintaining the closed state of the hatch cover 10.

According to the lock device L constructed in the manner described above, when the lever portion 13d of the operation member 13 is turned from its normal position shown with the solid line in FIG. 3 to a position (upward) shown with the phantom line against the force of the spring member 13b, the engaging member 18 is moved from a position shown with the solid line in FIG. 4 to a position shown with the phantom line, releasing the engagement between the engaging member 18 and the hold pin 11 inserted in the engaging hole 17. In this state, the locked state by the engaging member 18 is released and the cover 10 can be opened by lifting the cover 10 upward. Further, as shown in FIG. 3, the cover can be opened by putting a thumb on the upper portion of the hatch cover 10 and inserting a forefinger H under the hatch cover 10 from the side direction (side direction of the personal watercraft) to turn the operation member 13 upward, or conversely, by inserting the thumb under the hatch cover 10 from the side direction and putting remaining fingers on the upper portion of the hatch cover 10 to turn the operation member 13 upward and therefore, the hatch cover 10 can be opened easily.

Especially when the hatch cover 10 is employed in a personal watercraft, the operation members 13 of the lock device L are located at left and right sides of the rear portion 10b of the hatch cover 10 in front of the steering handle 5, therefore, the driver can release the lock device L by turning any one of the left and right operation members 13 (see FIG. 3) of the lock device L upward, by extending the hand to the rear end 10b (see FIG. 4) of the hatch cover 10 in front of the steering handle 5 at a position where the driver gets off from the seat 4. Therefore, the hatch cover 10 can be opened from any of the left and right sides of the personal watercraft.

Then, by turning the operation member 13 upward, the slide member 15 is slided to move the moving member 16 in a direction opposite from the engaging hole (in the direction Z shown in FIG. 5) releasing the engagement between the engaging member 18 and the hold pin 11 (FIG. 3) as shown with phantom line in FIG. 4, and the hatch cover 10 can be opened in the forward and upward direction rotating around its front end (see FIG. 1(b)).

The lock device L whose engagement with the hold pin 11 is released by the above described operation, is automatically returned to its locked position (shown with solid line in FIG. 3), when the driver's hand is removed from the operation member 13, by the forces of spring members 13b, 20 and 21, of the operation member 13, the slide member 15 and the moving member 16 respectively.

To close the hatch cover 10 from the state where the lock device L is in the locked position, the hatch cover 10 is closed until the engagement member 18 comes into contact with the tip portion of the hold pin 11, and then by pushing the hatch cover 10 strongly from above, the hatch cover 10 is retained in the locked state. That is, the engaging member 18 is moved apart from the engaging hole 17 against the force of the spring member 21 which biases the moving member 16 (FIG. 5) along the slope of the head of the hold pin 11 as shown in FIG. 8. If the engaging member 18 is inserted up to the engaging portion 11a of the hold pin 11, the moving member 16 biased by the force of the spring member 21 is moved toward the hold pin 11, and the engaging member 18 engages the engaging portion 11a. Thus, the hatch cover 10 can automatically be brought into the closed state only by pushing it into its closing direction, the moving member 16 biased by the spring member 21 is engaged with the engaging portion 11a of the hold pin 11 to maintain the closed state (FIG. 8).

Further, as shown in FIG. 3, since the operation member 13 for opening the hatch cover 10 is located substantially at the same height as the lower end 10c of the hatch cover 10 in the lateral direction in the hatch cover so that the operation member 13 does not appear from the outer surface of the hatch cover, there is no member which breaks the continuous surface of the personal watercraft and therefore, the external appearance of the personal watercraft is not deteriorated.

Although the embodiment has been explained while taking the case of the hatch cover 10 of the personal watercraft, even if another cover which is desired to be opened from any of left and right side or any of front and back side is used, the opening and closing operation can be enhanced likewise, and the invention of the present application should not be limited to the hatch cover 10 of the personal watercraft.

Numerous modifications and alternative embodiments of the present invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A lock device mounted on a cover that is locked to a hold pin attached to another member, said lock device comprising:
   a frame member formed to locate operation members at both sides below the inner surface of said cover, said frame member further including;
   a pair of individually movable slide members, individually movable in opposite directions, each of which can be slidably moved by an associated operation member during a releasing operational movement of said operation member;
   each of said slide members including a first end adjacent an associated operation member and an opposite second end;
   a moving member adjacent respective second ends of said slide members and caused to move in a direction perpendicular to a sliding direction of said slide members in response to the sliding motion of at least one of said slide members placing the respective second end of said slide member in engageable contact with said moving member; and
   an engaging member which moves together with said moving member to move into an engaging hole for engaging said hold pin.

2. The lock device of the cover according to claim 1, wherein said moving member is provided with a spring member.

3. The lock device of the cover according to claim 2, each of said slide members and said operation members are provided with a spring member.

4. In a personal watercraft including a deck, a hatch on the deck, a cover for the hatch, and a lock device mounted on the cover that is locked to a hold pin attached to the deck,
   said lock device is provided on an inner surface of a rear portion of said cover, including operation members with respective levers for releasing said lock device are disposed on both left and right sides of said cover within the interior of said cover and above the deck to define a gap between the cover bottom and the deck sufficient for an operator's finger to be inserted into said gap to operate the levers, and said lock device includes means such that an engaged state of said hatch cover can be released by individually operating either one of the levers of said operation members on the left and right sides.

5. The lock device of the cover according to claim 4, wherein the engaged state of said hatch cover is released by operating said operation member upward.

6. The lock device of the cover according to claim 5, wherein the releasing operation of said operation members is carried out by turning said operation members.

7. The lock device of the cover according to claim 4, wherein a frame member is mounted to a lower surface of a rear portion of said cover, said frame member is formed such that said pair of left and right operation members are located at both sides of said cover, said frame member further including;

a pair of individually movable slide members, individually movable in opposite directions, each of which can be slidably moved by an associated operation member during a releasing operational movement of said operation member;

each of said slide members including a first end adjacent an associated operation member and an opposite second end;

a moving member adjacent respective second ends of said slide members and caused to move in a direction perpendicular to a sliding direction of said slide members in response to the sliding movement of at least one of said slide members placing the respective second end of said slide member in engageable contact with said moving member; and an engaging member which moves together with said moving member to move into an engaging hole for engaging said hold pin.

* * * * *